US011032696B2

(12) United States Patent
Mehra

(10) Patent No.: US 11,032,696 B2
(45) Date of Patent: *Jun. 8, 2021

(54) SYSTEM AND METHOD FOR VIRTUAL GLOBAL TITLE TRANSLATION SERVICE

(71) Applicant: Syniverse Technologies, LLC, Tampa, FL (US)

(72) Inventor: Karan Mehra, Wesley Chapel, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,821

(22) Filed: Feb. 21, 2019

(65) Prior Publication Data
US 2019/0182658 A1 Jun. 13, 2019

Related U.S. Application Data

(63) Continuation of application No. 16/101,839, filed on Aug. 13, 2018, now Pat. No. 10,257,693.

(60) Provisional application No. 62/587,083, filed on Nov. 16, 2017.

(51) Int. Cl.
H04W 8/20 (2009.01)
H04W 92/02 (2009.01)
H04W 80/08 (2009.01)
H04W 92/24 (2009.01)
H04Q 3/00 (2006.01)
H04W 40/00 (2009.01)
H04W 88/16 (2009.01)

(52) U.S. Cl.
CPC ............ *H04W 8/20* (2013.01); *H04Q 3/0025* (2013.01); *H04W 40/00* (2013.01); *H04W 80/08* (2013.01); *H04W 92/02* (2013.01); *H04W 92/24* (2013.01); *H04W 88/16* (2013.01)

(58) Field of Classification Search
CPC ....... H04W 8/20; H04W 40/00; H04W 80/08; H04W 92/02; H04W 92/24; H04Q 3/0025
USPC ...................................................... 455/432.2
See application file for complete search history.

(56) References Cited

U.S. PATENT DOCUMENTS 6,308,276 B1 10/2001 Ashdown et al.
8,130,789 B2 3/2012 Schwalb

*Primary Examiner* — Joel Ajayi
(74) *Attorney, Agent, or Firm* — Molly L. Sauter; Smith & Hopen, P.A.

(57) ABSTRACT

A Virtual Global Title Translation (V-GTT) Service implemented in a Signaling Connection Control Part (SCCP) Gateway using a single American National Standards Institute (ANSI) SS7 Point Code and a single International Telecommunications Union (ITU) SS7 Point Code for access to destination hubs on ITU and ANSI SS7 side of the SS7 network. The V-GTT enables ANSI SS7 and ITU SS7 operators to send their destination SS7 hub-specific traffic to a single hub-specific protocol for either the ANSI or ITU SS7 Point Code of V-GTT. The V-GTT Service application manages the traffic between ANSI/ITU SS7 operator and destination SS7 hub operators and performs ANSI SS7 to ITU SS7 (or ITU SS7 to ANSI SS7) protocol conversion if the destination hub is on a different SS7 protocol, thereby enabling an originating operator to send traffic to a single V-GTT Service hub-specific point code using the protocol that the originating operator currently employs.

18 Claims, 8 Drawing Sheets

SYSTEM AND METHOD FOR VIRTUAL GLOBAL TITLE TRANSLATION SERVICE

CROSS-REFERENCE TO RELATED APPLICATIONS

This application is a continuation of and claims priority to U.S. patent application Ser. No. 16/101,839, entitled "SYSTEM AND METHOD FOR VIRTUAL GLOBAL TITLE TRANSLATION SERVICE," filed Aug. 13, 2018 and U.S. Provisional Patent Application No. 62/587,083, entitled "VIRTUAL GLOBAL TITLE TRANSLATION SERVICE," filed Nov. 16, 2017, the entirety of which are incorporated herein by reference.

BACKGROUND OF THE INVENTION

1. Field of the Invention

This invention relates generally to the field of telecommunications networks.

Specifically, it relates to a Virtual Global Title Translation (V-GTT) Service using SS7 Hub-specific ITU and ANSI point codes.

2. Brief Description of the Related Art

Interoperability between various communication networks is an important challenge in the field of telecommunications. One of the most significant steps in the development of communications networks is the Signaling System 7 (SS7) standard. Signaling System 7 is a standardized packet network architecture that allows the interchange of call control information between switches and databases within and across communication networks.

Although international standards bodies approved SS7 several decades ago, international networks are still far from completely interoperable because they use different SS7 protocols and different types of Global Title addressing. For example, communication networks within North America (herein after collectively called the North American network) use the American National Standards Institute (ANSI) SS7 protocol, while networks outside North America (herein after collectively referred to as the foreign network) use the International Telecommunications Union (ITU) SS7 protocol.

Accordingly, what is needed in the art is a system and method for improving the interoperability between networks operating on different SS7 protocols, thereby enabling roaming from one international network to the another.

SUMMARY OF THE INVENTION

The present invention advances the state of the art by simplifying routing of traffic from a Global System for Mobile Communications (GSM) originating operator to a destination-specific GSM destination hub using a single hub-specific point code in the mobile communications network. In operation, a Signaling Connection Control Part (SCCP) Gateway application performs the hub-specific updates required for SS7 GSM messages and routes the traffic between the originating operator and the destination hub.

The present invention provides, a method for transmitting signaling traffic in a mobile communications network. The method includes, transmitting, from an originating operator, signaling traffic over a mobile communications network, wherein the signaling traffic includes a point code identifying a destination hub in the mobile communications network and wherein the originating operator utilizes a first Signaling System 7 (SS7) protocol and the destination hub utilizes a second SS7 protocol. In a particular embodiment, the first SS7 protocol and the second SS7 protocol are the same. In an alternative embodiment, the first SS7 protocol is different from the second SS7 protocol. The method further includes, receiving the signaling traffic at a destination hub-specific point code of a Signaling Connection Control Part (SCCP) Gateway of the mobile communications network, wherein the destination hub-specific point code specifies the destination hub utilizing the first SS7 protocol. The method also includes, applying, by the SCCP Gateway, a predefined set of rules to the received signaling traffic based upon one or more requirements of the destination hub. If the first SS7 protocol is different from the second SS7 protocol, the method further includes, performing, by the SCCP Gateway, protocol conversion between the first SS7 protocol and the second SS7 protocol. Following the application of a predefined set of rules and possibly protocol conversion, the method continues by routing, by the SCCP Gateway, the signaling traffic between the originating operator and the destination hub using the second SS7 protocol and between the destination hub and the originating operator using the first SS7 protocol.

In one embodiment, the first SS7 protocol may be an International Telecommunications Union (ITU) SS7 protocol and the second SS7 protocol may be an American National Standards Institute (ANSI) SS7 protocol. In another embodiment, the first SS7 protocol may be an American National Standards Institute (ANSI) SS7 protocol and the second SS7 protocol may be an International Telecommunications Union (ITU) SS7 protocol. In an additional embodiment, both the first SS7 protocol and the second SS7 protocol may be ITU SS7 protocols or alternatively, both the first SS7 protocol and the second SS7 protocol may be ANSI SS7 protocols.

The destination hub may be selected from a VRS (Vodafone Roaming Services) Hub, a France Telecom (FT) Hub, a Key2Roam Hub, a Link2One Hub, a BICS (Belgacom International Carrier Services) Hub or any other hub known in the art, based upon hub requirements.

The predefined set of rules may include prefixing Global Title (GT) Addresses with destination hub-specific GT digits, altering a GT Address specific to the destination hub, changing a Translation Type, changing a Numbering Plan (NP), changing an Encoding Scheme (ES), changing a Nature of Address (NOA), applying GT, NP, ES, NOA treatment per GSM Mobile Application Part (MAP) and CAMEL Application Part (CAP) Operation Code and an Application Context, and modifying SCCP or Transaction Capabilities Application Part (TCAP) parameters.

The invention further provides a system for transmitting signaling traffic in a mobile communications network. The system includes, a Signaling Connection Control Part (SCCP) Gateway of a mobile communications network, the SCCP Gateway for receiving signaling traffic at a destination hub-specific point code of the SCCP Gateway, where the signaling traffic is transmitted from one or more originating operators and the signaling traffic includes a point code identifying a destination hub in the mobile communications network and the destination hub-specific point code specifies the destination hub, and wherein the originating operator utilizes a first Signaling System 7 (SS7) protocol and the destination hub utilizes a second SS7 protocol. In a particular embodiment, the first SS7 protocol and the second SS7 protocol are the same. In an alternative embodiment, the first SS7 protocol is different from the second SS7 protocol. The SCCP Gateway is configured for applying a predefined set of rules to the received signaling traffic based upon one or more requirements of the destination hub. If the first SS7 protocol and the second SS7 protocol are different SS7 protocols, the SCCP Gateway is further configured for performing protocol conversion between the first SS7 protocol and the second SS7 protocol. Following the application of the predefined set of rules and possible protocol conversion, the SCCP Gateway is further configured for routing the signaling traffic between the originating operator and the destination hub using the second SS7 protocol and between the destination hub and the originating operator using the first SS7 protocol.

The invention additionally provides, a computer program product comprising computer executable instructions embodied in a computer-readable medium for receiving signaling traffic at a destination hub-specific point code of a Signaling Connection Control Part (SCCP) Gateway of the mobile communications network, wherein the signaling traffic is transmitted from one or more originating operators and the signaling traffic includes a point code identifying a destination hub in the mobile communications network and the destination hub-specific point code specifies the destination hub, and wherein the originating operator utilizes a first Signaling System 7 (SS7) protocol and the destination hub utilizes a second SS7 protocol. In a particular embodiment, the first SS7 protocol and the second SS7 protocol are the same. In an alternative embodiment, the first SS7 protocol is different from the second SS7 protocol. The instructions further include applying, by the SCCP Gateway, a predefined set of rules to the received signaling traffic based upon one or more requirements of the destination hub. If the first SS7 protocol is different form the second SS7 protocol, the instructions further include performing, by the SCCP Gateway, protocol conversion between the first SS7 protocol and the second SS7 protocol. Following the application of the predefined set of rules and possible protocol conversion, the instructions further include routing, by the SCCP Gateway, the signaling traffic between the originating operator and the destination hub using the second SS7 protocol and between the destination hub and the originating operator using the first SS7 protocol.

The invention obviates the requirement for the originating operator to make hub-specific changes, which can be different for each destination hub (akin to using different Translation Type or use of hub specific Global Title). The invention enables originating operators to send their destination hub specific traffic to a SCCP Gateway hub specific ANSI or ITU Point Code using the same SS7 protocol the operator already uses. The SCCP Gateway application manages originating operator and destination hub specific changes, and performs SS7 protocol conversion if the destination hub is not utilizing the same SS7 protocol as the originating operator.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE INVENTION

Figure 1A:
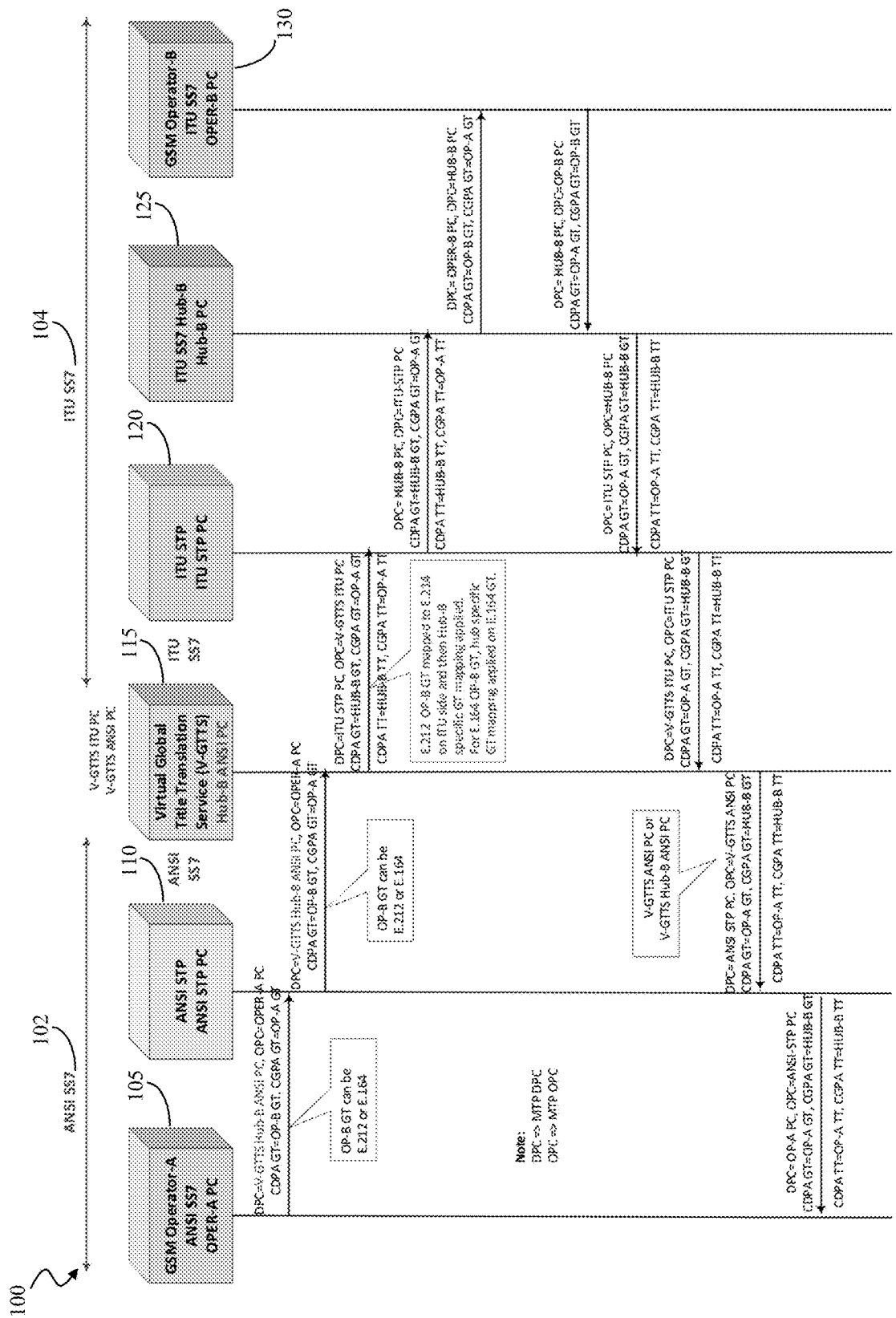
FIG. 1A is a signal flow diagram depicting Virtual Global Title Translation Service for a scenario in which an originating operator in an ANSI SS7 Network roams with network operators behind a hub in an ITU SS7 Network, in accordance with an embodiment of the present invention.

In various embodiments, the present invention provides Virtual Global Title Translation (V-GTT) Service using a single ANSI SS7 Point Code and a single ITU SS7 point code for access to destination hubs on an ITU SS7 or an ANSI SS7 side of the SS7 communication network. The invention enables ANSI SS7 and ITU SS7 operators to send their destination SS7 Hub-specific traffic to a single hub-specific ANSI SS7 or ITU SS7 point code of Virtual Global Title Translation Service.

A point code is a code that is assigned to each node (signaling point) in an SS7 network. ITU point codes are unstructured 14 bit point codes and ANSI point codes are structured 24 bit point codes. Points codes are unique and identify individual network elements for a signaling point used in Message Transfer Part (MTP) to identity the destination and the origination of a message signal unit (MSU). Each MSU contains both an Origination Point Code (OPC) and a Destination Point Code (DPC). The DPC is used for identifying the message's destination and the OPC is used for identifying the node that originated the message. Point codes are transferred in signaling messages that are exchanged between signaling end points. Using MTP point code routing, MSUs pass through the Signal Transfer Points (STPs) until they reach the Signaling Point (SP) that has the correct Destination Point Code (DPC).

The assignment of point codes is managed by various government organizations. The United States and other North American Numbering Plan (NANP) countries are maintained in one database.

The OPC and DPC reflect the MTP origination and destination point codes. However, they may be altered by Global Title Translation (GTT) implemented by Signaling Connection Control Part (SCCP). SCCP is a network layer protocol that provides extending routing and flow control in SS7 communication networks and relies on MTP for basic routing and error detection. In SCCP, a Global Title (GT) is an address that is used for routing signaling traffic on the communication network. However, it is not an address of a node in the SS7 network, but is instead considered to be an alias for such an address that needs to be translated into an SS7 network address. A global title (GT) is an address used in the SCCP protocol for routing signaling messages on telecommunications networks. While in theory, a global title is a unique address which refers to only one destination, though in practice destinations can change over time. Global Title Translation (GTT) Service is an SS7 process that utilizes a routing table to convert a telephone number into an actual destination address or into an address of an STP that contains the customer data necessary to process a call.

In the present invention, at a Signaling Connection Control Part SCCP Gateway, the Virtual Global Title Translation (GTT) Service application manages the traffic between an ANSI SS7 or ITU SS7 originating operator and an ANSI SS7 or ITU SS7 destination hub and performs ANSI SS7 to ITU SS7 (or ITU SS7 to ANSI SS7) protocol conversion if the destination hub is operating on a different SS7 protocol. The invention enables an originating operator to send signaling traffic to a single Virtual Global Title Translation Service hub-specific point code using the SS7 protocol that the originating operator already employs.

In operation, an originating operator in an ANSI SS7 Network will route its traffic to a hub-specific ANSI point code, whereas an originating operator in an ITU SS7 Network will route its traffic to a hub-specific ITU point code. Originating operators route their GSM SS7 traffic to and from these hubs using Virtual Global Title Translation Service hub-specific ANSI or ITU point codes, which are primarily used for roaming on GSM SS7 operators behind these hubs.

It is within the scope of the present invention to introduce additional SS7 hubs that can be supported by the Virtual Global Title Translation Service, which would support the unique requirements of each additional SS7 hub. Hub-specific changes and updates to an SS7 message are performed by the Virtual Global Title Translation Service at the SCCP Gateway.

A process used in a common-channel signaling system (such as SS7) that uses a routing table to convert an address (usually a telephone number) into the actual destination address (forwarding telephone number) or into the address of a service control point (database) that contains the customer data needed to process a call.

In the present invention, in Virtual Global Title Translation Service of SCCP Gateway, a single ANSI SS7 Point Code and a single ITU SS7 Point Code are assigned for each Hub. As such, ITU SS7 operators who want to roam with operators behind any specific ANSI SS7 or ITU SS7 hub, may send their hub-specific traffic to Virtual GT Translation Service SCCP Gateway hub-specific ITU point code (using the same ITU SS7 protocol they already use). Additionally, ANSI SS7 operators who want to roam with operators behind any specific ANSI SS7 or ITU SS7 hub, send their hub-specific traffic to Virtual GT Translation Service SCCP Gateway hub-specific ANSI point code (using the same ANSI SS7 protocol they already use).

The Virtual GT Translation Service of SCCP Gateway applies hub specific treatment and will route the traffic between originating operator and destination hub and, if required, will perform protocol conversion between ITU SS7 and ANSI SS7 networks. Virtual GT Translation Service supports all versions of ITU SS7 Protocol and all versions for ANSI SS7 Protocol. It further supports UDT (Unitdata), UDTS (Unitdata Service), XUDT (Extended Unitdata), XUDTS (Extended Unitdata Service), LUDT (Long Unitdata) and LUDTS (Long Unitdata Service) SS7 messages.

Operators that do not use the Virtual Global Title Translation Service described herein must perform and manage the hub-specific changes on their switches, ensure that intermediate STP's are able to support these signaling changes, and performs the SS7 protocol conversion, if the hub is on other SS7 network. For Example, if originating Operator A wants to roam with operators behind five different hubs, Operator A would have to manage each hub-specific change on its network (which may not be available on its specific switch), while accounting for SS7 protocol conversions and maintaining synergy between ITU and ANSI SS7 protocols with hub-specific changes. These tasks become quite challenging because they use different numbering plans: E.212 (used in ANSI SS7), E.214 (used in ITU SS7), and E.164 (used in switch to switch routing).

FIG. 1A is a signal flow diagram 100 depicting Virtual Global Title Translation Service for a scenario in which an originating operator in an ANSI SS7 Network 102 roams with network operators behind a hub in an ITU SS7 Network 104. As shown in FIG. 1A, originating Operator-A 105 operating in an ANSI SS7 Network wants to roam with destination Operator-B 130 behind Hub-B 125, operating in an ITU SS7 Network. As such, originating Operator-A 105 will send its GSM ANSI SS7 signaling traffic to the point code of Hub-B at the Virtual GT Translation Service (V-GTTS) SSCP Gateway 115. Accordingly, the destination point code (DPC) is the ANSI point code at the V-GTTS 115 and the originating point code (OPC) is the point code of the originating operator 105. Additionally, the called party address (CDPA) Global Title is equal to Operator-B 130 Global Title and the calling party address (CGPA) is equal to the Operator-A 105 Global Title. The Operator-A Global Title may use either E.212 or E.164 numbering plan.

The Virtual GT Translation Service of SCCP Gateway 115 will then apply hub specific treatment to the signaling traffic, based upon the specific requirements of Hub-B 125. The Virtual GT Translation Service of SCCP Gateway 115 will also perform protocol conversion of the signaling traffic from ANSI SS7 to ITU SS7 and then route the traffic to Hub-B 125. In particular, the V-GTTS 115 may set the destination point code (DPC) to an ITU Signal Transfer Point 120 point code and may set the originating point code (OPC) to equal the V-GTTS ITU point code. The V-GTTS 115 may additionally set the CDPA Global Title or the CDPA Translation Type to be equal to the Hub-B 125 Global Title and may set the CGPA Global Title to be equal to the Operator-A 105 Global Title. As such, E.212 Operator-B 130 Global Title may be mapped to E.214 on the ITU side and then Hub-B specific Global Title mapping may be applied. Alternatively, for E.164, Operator-B Global Title hub specific Global Title mapping may be applied to the E.164 Global Title. Following translation and protocol conversion of the signaling traffic from ANSI SS7 to ITU SS7, the V-GTTS 115 routes the signaling traffic to Hub-B 125 either directly, or alternatively, through one or more Signal Transfer Points (STP) 120 in the ITU SS7 network. Hub-B 125 then routes the signaling to Operator-B 130, as originally identified by Operator-A 105 in the CDPA.

As shown in FIG. 1A, traffic from Operator-B 130 follows a reverse path back to Operator A 105, wherein the V-GTTS 115 performs translation and protocol conversion of the traffic back to ANSI SS7 prior to routing the return traffic back to Operator-A 105.

Figure 1B:
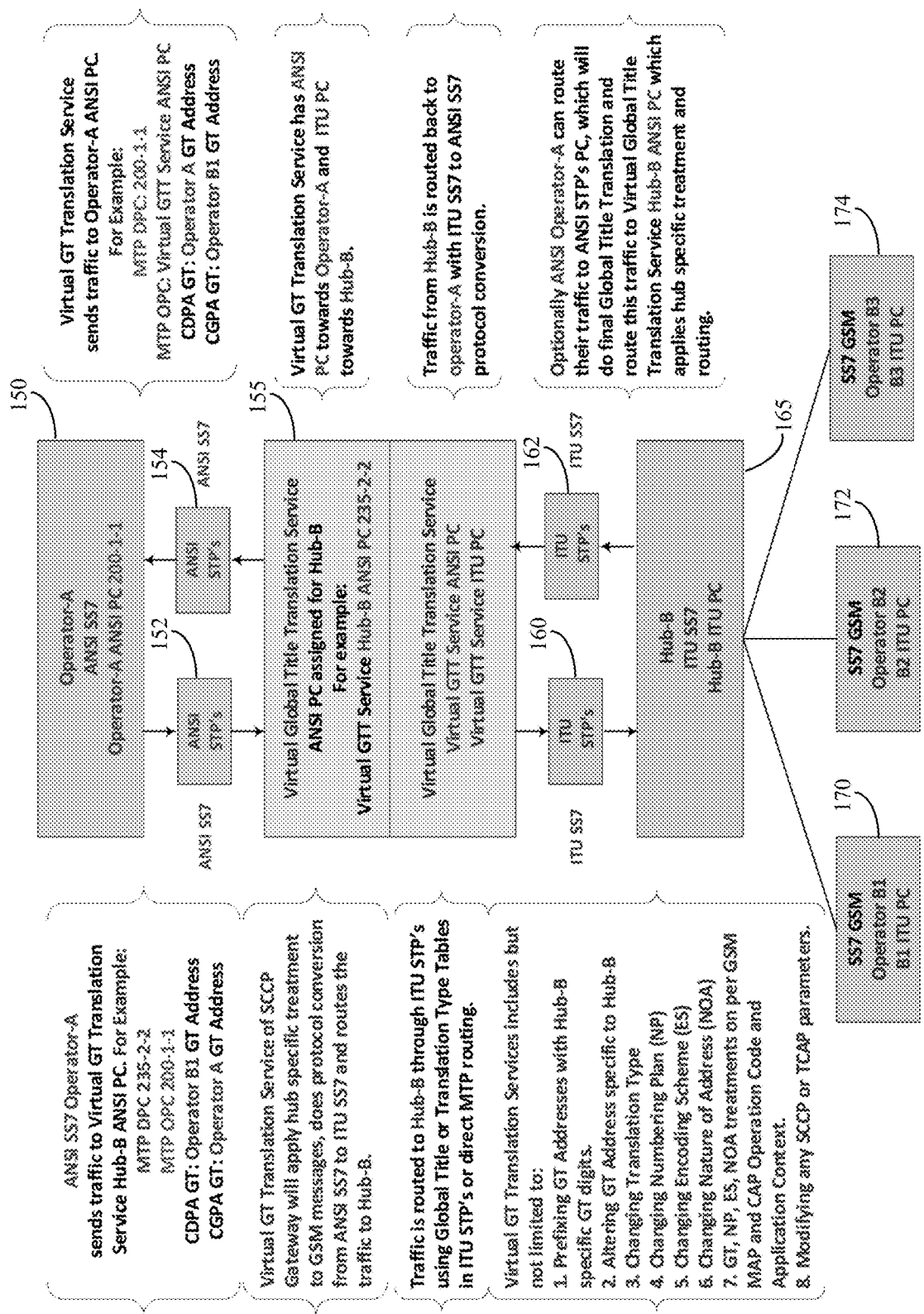
FIG. 1B is a flowchart depicting a Virtual Global Title Translation Service for a scenario in which an originating operator in an ANSI SS7 Network roams with network operators behind a hub in an ITU SS7 Network, in accordance with an embodiment of the present invention.

FIG. 1B is a flowchart depicting a Virtual Global Title Translation Service for a scenario in which an originating operator (Operator-A) 150 in an ANSI SS7 Network roams with network operators 170, 172, 174 behind a destination hub (Hub-B) 165 in an ITU SS7 Network.

As shown in FIG. 1B, ANSI SS7 Operator-A 150 sends traffic to the Virtual GT Translation Service Hub-B ANSI Point Code 155. The CDPA Global Title is set to Operator-81 170 Global Title Address and CGPA Global Title is set to Operator-A 150 Global Title Address. Additionally, in this exemplary embodiment, the Message Transfer Part (MTP) Destination Point Code is 235-2-2 and the MTP Originating Point Code is 200-1-1.

Optionally, ANSI SS7 Operator-A 150 could route the traffic to one or more ANSI STP 152, 154 prior to routing to the V-GTT Service on the SCCP Gateway 155. The STPs 152, 154 may perform Global Title Translation and then route the traffic to the V-GTT Service Hub-B ANSI Point Code, which will then apply hub specific treatment and appropriate routing to Hub-B 165.

In operation, the Virtual GT Translation Service of the SCCP Gateway 155 applies hub specific treatment to the signaling traffic, based upon the requirements of Hub-B 165, and performs protocol conversion from ANSI SS7 to ITU SS7 prior to routing the signaling traffic to Hub-B 165. The traffic may be routed to Hub-B 165 through ITU STPs' 160, 162 using Global Title or Translation Type Tables, or alternatively, the traffic may be routed using direct MTP routing to Hub-B 165. Traffic from Hub-B 165 may then be routed back to Operator-A 150 with ITU SS7 to ANSI SS7 protocol conversion.

Figure 2A:
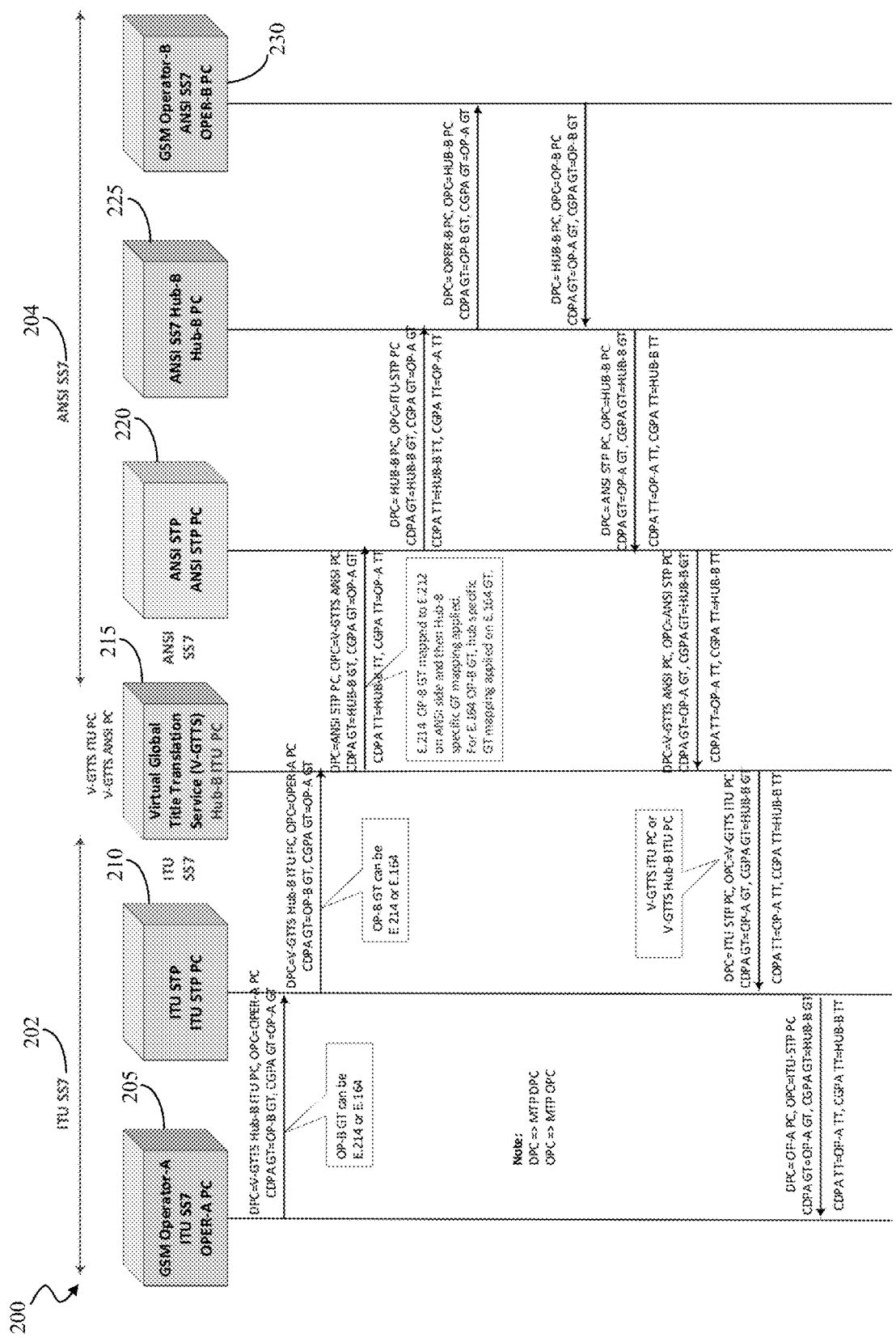
FIG. 2A is a signal flow diagram depicting a Virtual Global Title Translation Service for a scenario in which an originating operator in an ITU SS7 Network roams with network operators behind a hub in an ANSI SS7 Network, in accordance with an embodiment of the present invention.

FIG. 2A is a signal flow diagram 200 depicting Virtual Global Title Translation Service for a scenario in which an originating operator in an ITU SS7 Network 202 roams with network operators behind a hub in an ANSI SS7 Network 204. As shown in FIG. 2A, originating Operator-A 205 operating in an ITU SS7 Network wants to roam with destination Operator-B 230 behind Hub-B 225, operating in an ANSI SS7 Network. As such, originating Operator-A 205 will send its GSM ITU SS7 signaling traffic to the point code of Hub-B at the Virtual GT Translation Service (V-GTTS) SCCP Gateway 215. Accordingly, the destination point code (DPC) is the ITU point code at the V-GTTS 215 and the originating point code (OPC) is the point code of the originating operator 205. Additionally, the called party address (CDPA) Global Title is equal to Operator-B 230 Global Title and the calling party address (CGPA) is equal to the Operator-A 205 Global Title. The Operator-A Global Title may use either E.214 or E.164 numbering plan.

The Virtual GT Translation Service of SCCP Gateway 215 will then apply hub specific treatment to the signaling traffic, based upon the specific requirements of Hub-B 225. The Virtual GT Translation Service of SCCP Gateway 215 will also perform protocol conversion of the signaling traffic from ITU SS7 to ANSI SS7 and then route the traffic to Hub-B 225. In particular, the V-GTTS 215 may set the destination point code (DPC) to an ANSI Signal Transfer Point 220 point code and may set the originating point code (OPC) to equal the V-GTTS ANSI point code. The V-GTTS 215 may additionally set the CDPA Global Title or the CDPA Translation Type to be equal to the Hub-B 225 Global Title and may set the CGPA Global Title to be equal to the Operator-A 205 Global Title. As such, E.214 Operator-B 230 Global Title may be mapped to E.212 on the ANSI side and then Hub-B specific Global Title mapping may be applied. Alternatively, for E.164, Operator-B Global Title hub specific Global Title mapping may be applied to the E.164 Global Title. Following translation and protocol conversion of the signaling traffic from ITU SS7 to ANSI SS7, the V-GTTS 215 routes the signaling traffic to Hub-B 225 either directly, or alternatively, through one or more Signal Transfer Points (STP) 220 in the ANSI SS7 network. Hub-B 225 then routes the signaling to Operator-B 230, as originally identified by Operator-A 205 in the CDPA.

As shown in FIG. 2A, traffic from Operator-B 230 follows a reverse path back to Operator A 205, wherein the V-GTTS 215 performs translation and protocol conversion of the traffic back to ITU SS7 prior to routing the return traffic back to Operator-A 205.

Figure 2B:
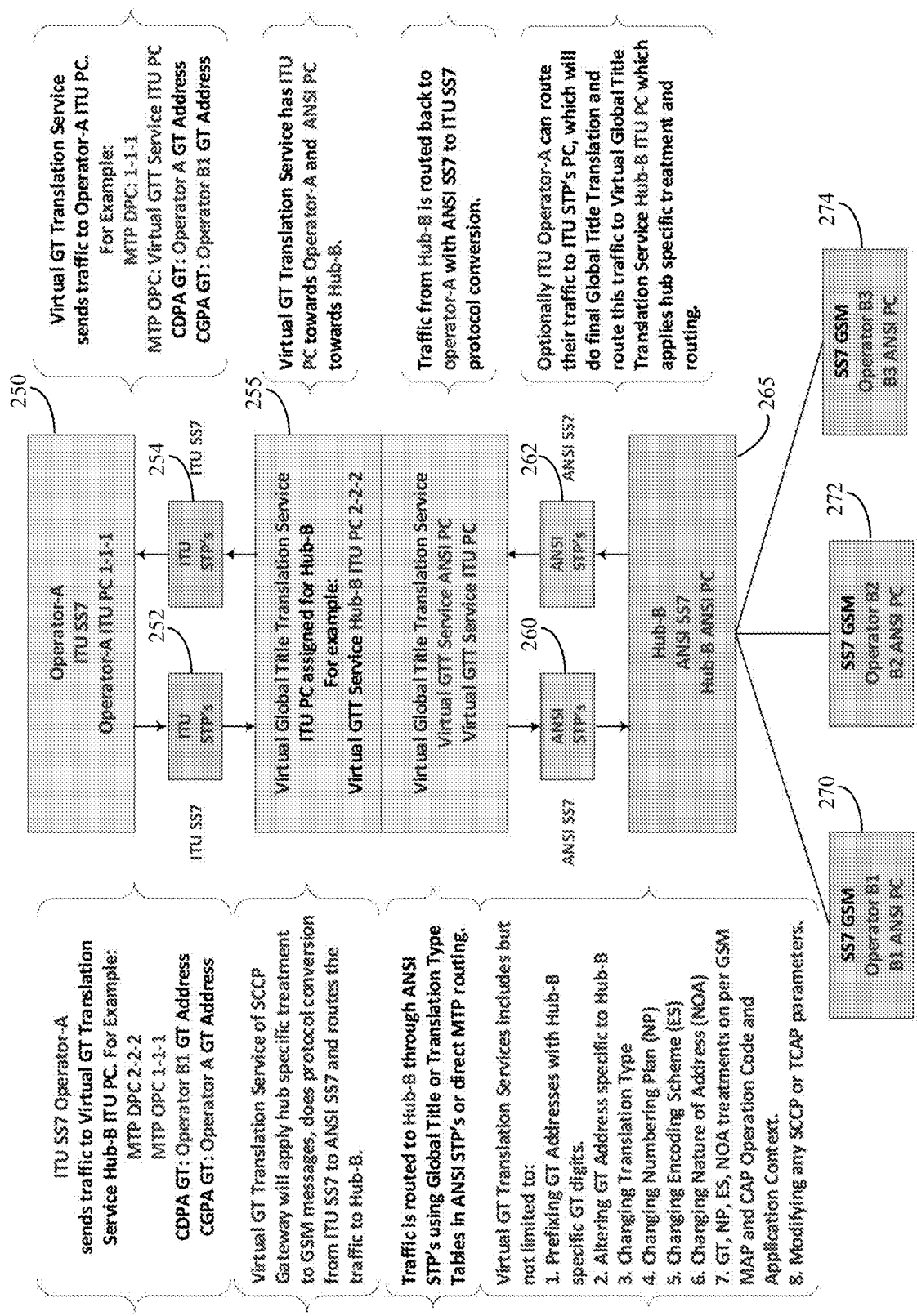
FIG. 2B is a flowchart depicting a Virtual Global Title Translation Service for a scenario in which an originating operator in an ITU SS7 Network roams with network operators behind a hub in an ANSI SS7 Network, in accordance with an embodiment of the present invention.

FIG. 2B is a flowchart depicting a Virtual Global Title Translation Service for a scenario in which an originating operator (Operator-A) 250 in an ITU SS7 Network roams with network operators 270, 272, 274 behind a destination hub (Hub-B) 265 in an ANSI SS7 Network.

As shown in FIG. 2B, ITU SS7 Operator-A 250 sends traffic to the Virtual GT Translation Service Hub-B ANSI Point Code 255. The CDPA Global Title is set to Operator-81 270 Global Title Address and CGPA Global Title is set to Operator-A 250 Global Title Address. Additionally, in this exemplary embodiment, the Message Transfer Part (MTP) Destination Point Code is 2-2-2 and the MTP Originating Point Code is 1-1-1.

Optionally, ITU SS7 Operator-A 250 could route the traffic to one or more ITU STP 252, 254 prior to routing to the V-GTT Service on the SCCP Gateway 255. The STPs 252, 254 may perform Global Title Translation and then route the traffic to the V-GTT Service Hub-B ITU Point Code, which will then apply hub specific treatment and appropriate routing to Hub-B 265.

In operation, the Virtual GT Translation Service of the SCCP Gateway 255 applies hub specific treatment to the signaling traffic, based upon the requirements of Hub-B 265, and performs protocol conversion from ITU SS7 to ANSI SS7 prior to routing the signaling traffic to Hub-B 265. The traffic may be routed to Hub-B 265 through ANSI STPs' 260, 262 using Global Title or Translation Type Tables, or alternatively, the traffic may be routed using direct MTP routing to Hub-B 265. Traffic from Hub-B 265 may then be routed back to Operator-A 250 with ANSI SS7 to ITU SS7 protocol conversion.

Figure 3A:
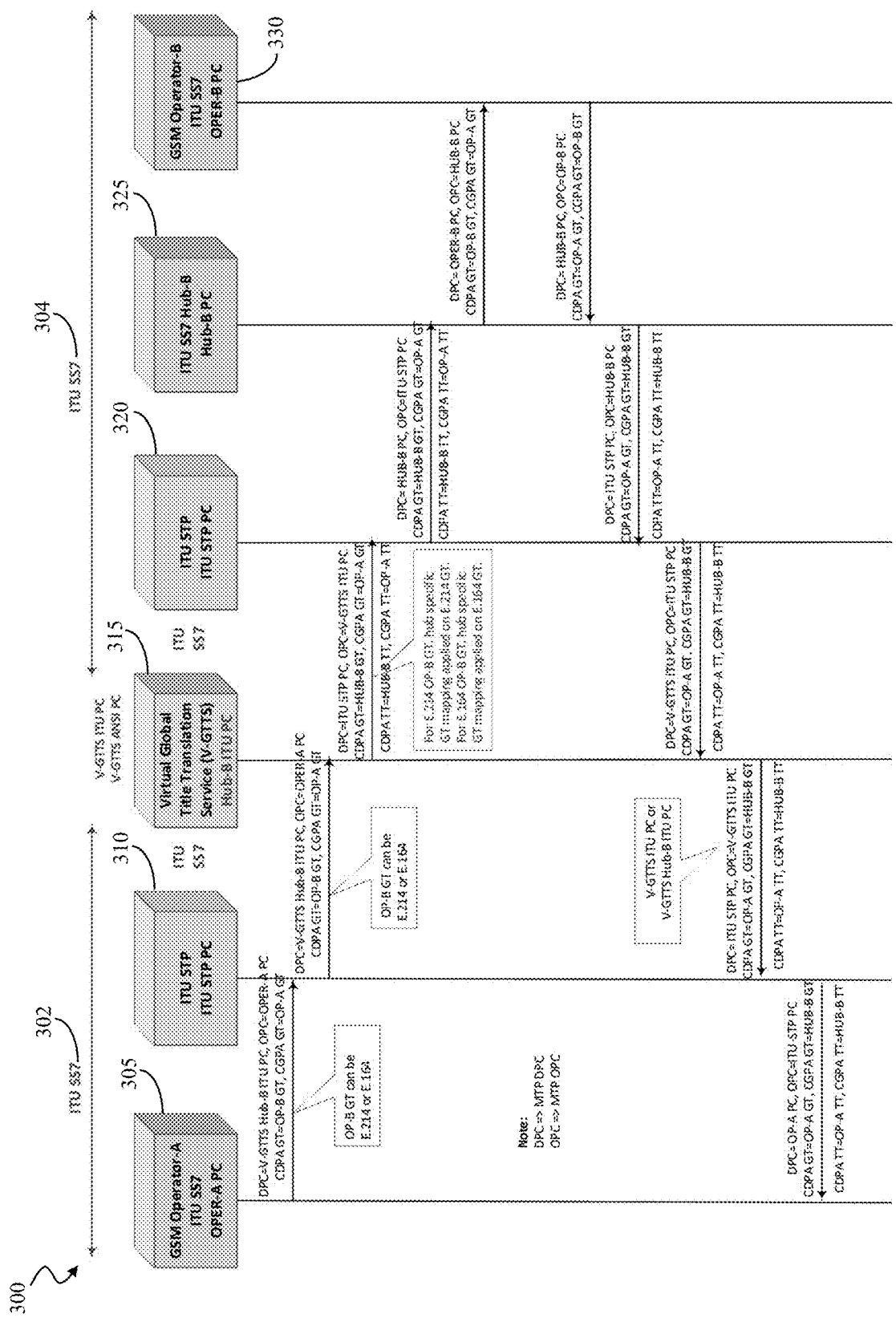
FIG. 3A is a signal flow diagram depicting a Virtual Global Title Translation Service for a scenario in which an originating operator in an ITU SS7 Network roams with network operators behind a hub in an ITU SS7 Network, in accordance with an embodiment of the present invention.

FIG. 3A is a signal flow diagram 300 depicting Virtual Global Title Translation Service for a scenario in which an originating operator in an ITU SS7 Network 302 roams with network operators behind a hub in an ITU SS7 Network 304. As shown in FIG. 3A, originating Operator-A 305 operating in an ITU SS7 Network wants to roam with destination Operator-B 330 behind Hub-B 325, also operating in an ITU SS7 Network. As such, originating Operator-A 305 will send its GSM ITU SS7 signaling traffic to the point code of Hub-B at the Virtual GT Translation Service (V-GTTS) SCCP Gateway 315. Accordingly, the destination point code (DPC) is the ITU point code at the V-GTTS 315 and the originating point code (OPC) is the point code of the originating operator 305. Additionally, the called party address (CDPA) Global Title is equal to Operator-B 330 Global Title and the calling party address (CGPA) is equal to the Operator-A 305 Global Title. The Operator-A Global Title may use either E.214 or E.164 numbering plan.

The Virtual GT Translation Service of SCCP Gateway 315 will then apply hub specific treatment to the signaling traffic, based upon the specific requirements of Hub-B 325. The Virtual GT Translation Service of SCCP Gateway 315 will then route the traffic to Hub-B 325. In particular, the V-GTTS 315 may set the destination point code (DPC) to an ITU Signal Transfer Point 320 point code and may set the originating point code (OPC) to equal the V-GTTS ITU point code. The V-GTTS 315 may additionally set the CDPA Global Title or the CDPA Translation Type to be equal to the Hub-B 325 Global Title and may set the CGPA Global Title to be equal to the Operator-A 305 Global Title. As such, E.214 Operator-B 330 Global Title may be mapped to E.214 and then Hub-B specific Global Title mapping may be applied. Alternatively, for E.164, Operator-B Global Title hub specific Global Title mapping may be applied to the E.164 Global Title. Following the configuration of the signaling traffic, the V-GTTS 315 routes the signaling traffic to Hub-B 325 either directly, or alternatively, through one or more Signal Transfer Points (STP) 320 in the ITU SS7 network. Hub-B 325 then routes the signaling to Operator-B 330, as originally identified by Operator-A 305 in the CDPA.

As shown in FIG. 3A, traffic from Operator-B 330 follows a reverse path back to Operator A 305, wherein the V-GTTS 315 routes the return traffic back to Operator-A 305.

Figure 3B:
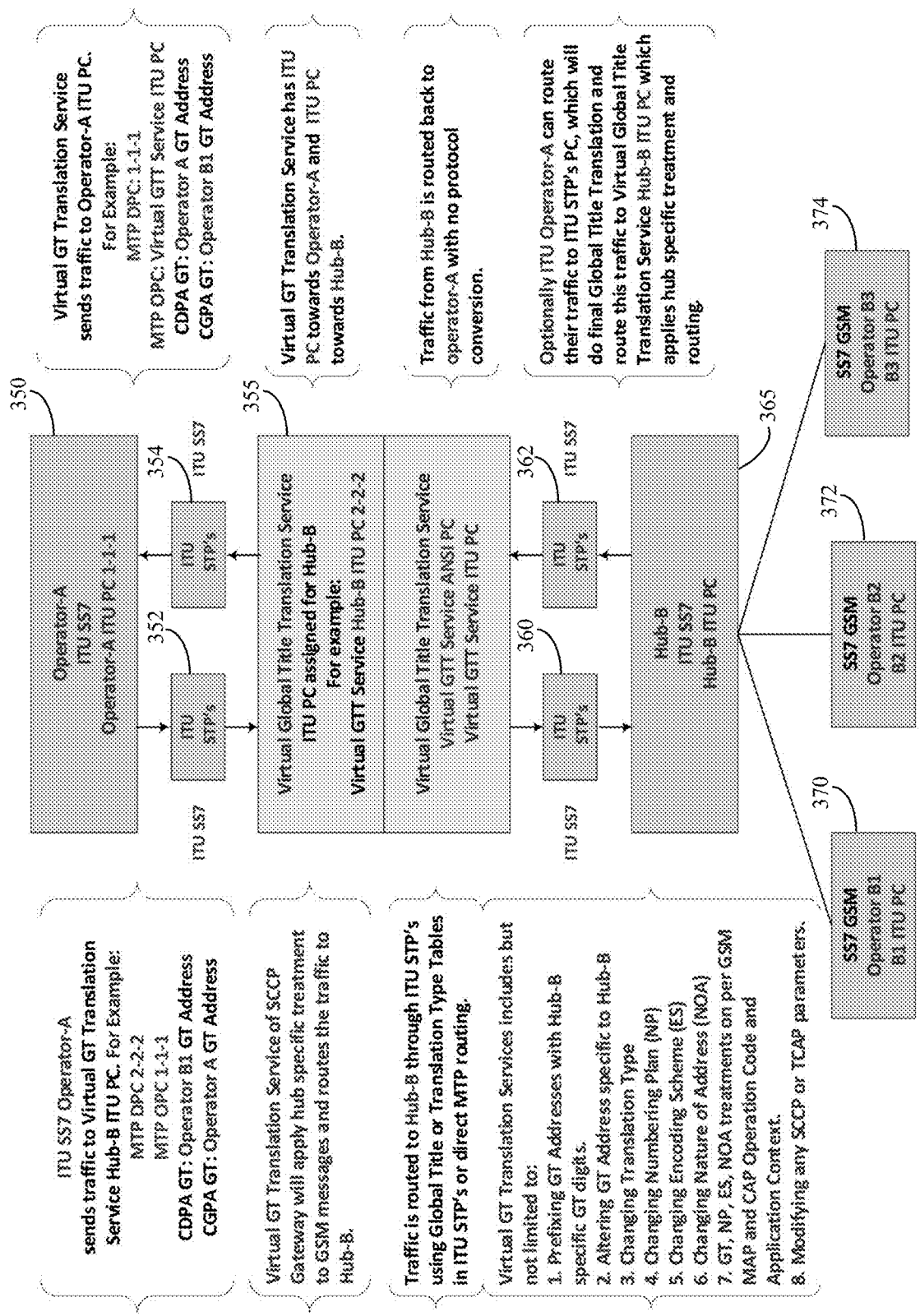
FIG. 3B is a flowchart depicting a Virtual Global Title Translation Service for a scenario in which an originating operator in an ITU SS7 Network roams with network operators behind a hub in an ITU SS7 Network, in accordance with an embodiment of the present invention.

FIG. 3B is a flowchart depicting a Virtual Global Title Translation Service for a scenario in which an originating operator (Operator-A) 350 in an ITU SS7 Network roams with network operators 370, 372, 374 behind a destination hub (Hub-B) 365 in an ITU SS7 Network.

As shown in FIG. 3B, ITU SS7 Operator-A 350 sends traffic to the Virtual GT Translation Service Hub-B ITU Point Code 355. The CDPA Global Title is set to Operator-B1 370 Global Title Address and CGPA Global Title is set to Operator-A 350 Global Title Address. Additionally, in this exemplary embodiment, the Message Transfer Part (MTP) Destination Point Code is 2-2-2 and the MTP Originating Point Code is 1-1-1.

Optionally, ITU SS7 Operator-A 350 could route the traffic to one or more ITU STP 352, 354 prior to routing to the V-GTT Service on the SCCP Gateway 355. The STPs 352, 354 may perform Global Title Translation and then route the traffic to the V-GTT Service Hub-B ITU Point Code, which will then apply hub specific treatment and appropriate routing to Hub-B 365.

In operation, the Virtual GT Translation Service of the SCCP Gateway 355 applies hub specific treatment to the signaling traffic, based upon the requirements of Hub-B 365, and routes the signaling traffic to Hub-B 365. The traffic may be routed to Hub-B 365 through ITU STPs' 360, 362 using Global Title or Translation Type Tables, or alternatively, the traffic may be routed using direct MTP routing to Hub-B 365. Traffic from Hub-B 365 may then be routed back to Operator-A 350.

Note that the implementation shown in FIG. 3A and FIG. 3B does not require protocol conversion because both the originating operator and the destination operator operate under the ITU SS7 protocol.

Figure 4A:
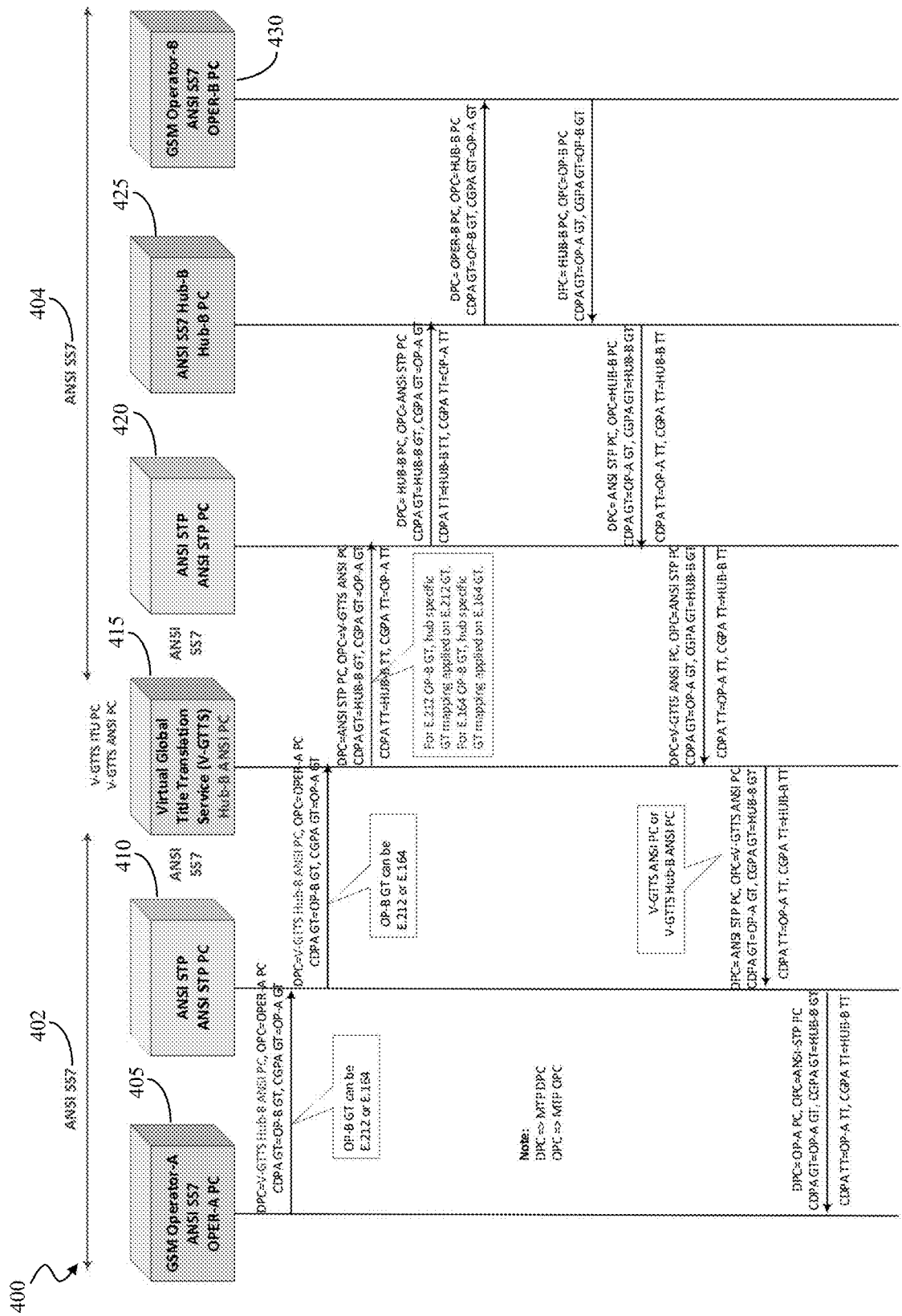
FIG. 4A is a signal flow diagram depicting a Virtual Global Title Translation Service for a scenario in which an originating operator in an ANSI SS7 Network roams with network operators behind a hub in an ANSI SS7 Network, in accordance with an embodiment of the present invention.

FIG. 4A is a signal flow diagram 400 depicting Virtual Global Title Translation Service for a scenario in which an originating operator in an ANSI SS7 Network 402 roams with network operators behind a hub in an ANSI SS7 Network 404. As shown in FIG. 4A, originating Operator-A 405 operating in an ANSI SS7 Network wants to roam with destination Operator-B 430 behind Hub-B 425, also operating in an ANSI SS7 Network. As such, originating Operator-A 405 will send its GSM ANSI SS7 signaling traffic to the point code of Hub-B at the Virtual GT Translation Service (V-GTTS) SCCP Gateway 415. Accordingly, the destination point code (DPC) is the ANSI point code at the V-GTTS 415 and the originating point code (OPC) is the point code of the originating operator 405. Additionally, the called party address (CDPA) Global Title is equal to Operator-B 430 Global Title and the calling party address (CGPA) is equal to the Operator-A 405 Global Title. The Operator-A Global Title may use either E.212 or E.164 numbering plan.

The Virtual GT Translation Service of SCCP Gateway 415 will then apply hub specific treatment to the signaling traffic, based upon the specific requirements of Hub-B 425. The Virtual GT Translation Service of SCCP Gateway 415 will then route the traffic to Hub-B 425. In particular, the V-GTTS 415 may set the destination point code (DPC) to an ANSI Signal Transfer Point 420 point code and may set the originating point code (OPC) to equal the V-GTTS ANSI point code. The V-GTTS 415 may additionally set the CDPA Global Title or the CDPA Translation Type to be equal to the Hub-B 425 Global Title and may set the CGPA Global Title to be equal to the Operator-A 405 Global Title. As such, E.212 Operator-B 430 Global Title may be mapped to E.212 and then Hub-B specific Global Title mapping may be applied. Alternatively, for E.164, Operator-B Global Title hub specific Global Title mapping may be applied to the E.164 Global Title. Following the configuration of the signaling traffic, the V-GTTS 415 routes the signaling traffic to Hub-B 425 either directly, or alternatively, through one or more Signal Transfer Points (STP) 420 in the ANSI SS7 network. Hub-B 425 then routes the signaling to Operator-B 430, as originally identified by Operator-A 405 in the CDPA.

As shown in FIG. 4A, traffic from Operator-B 430 follows a reverse path back to Operator A 405, wherein the V-GTTS 415 routes the return traffic back to Operator-A 405.

Figure 4B:
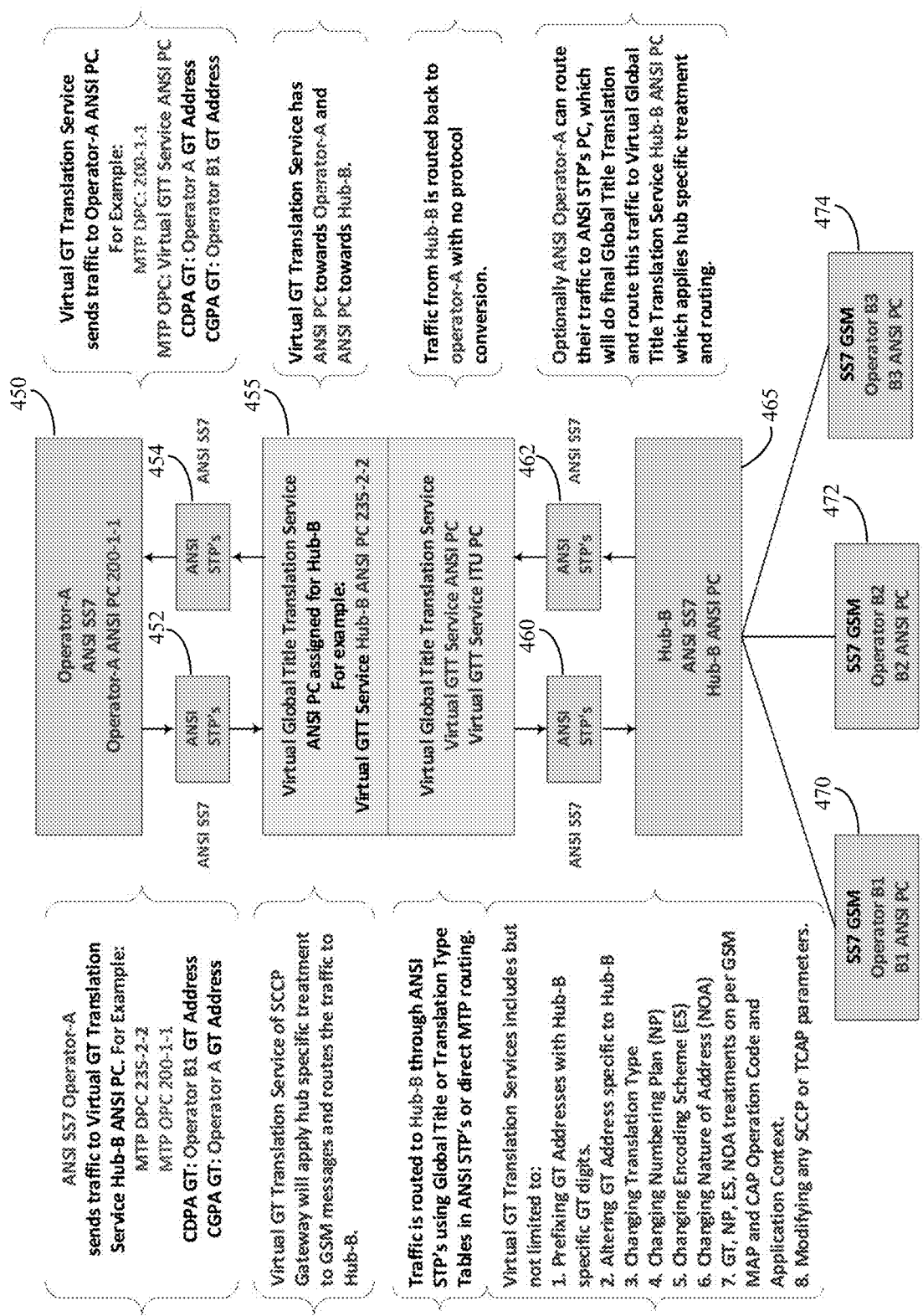
FIG. 4B is a flowchart depicting a Virtual Global Title Translation Service for a scenario in which an originating operator in an ANSI SS7 Network roams with network operators behind a hub in an ANSI SS7 Network, in accordance with an embodiment of the present invention.

FIG. 4B is a flowchart depicting a Virtual Global Title Translation Service for a scenario in which an originating operator (Operator-A) 450 in an ANSI SS7 Network roams with network operators 470, 472, 474 behind a destination hub (Hub-B) 465 in an ANSI SS7 Network.

As shown in FIG. 4B, ANSI SS7 Operator-A 450 sends traffic to the Virtual GT Translation Service Hub-B ANSI Point Code 455. The CDPA Global Title is set to Operator-81 470 Global Title Address and CGPA Global Title is set to Operator-A 450 Global Title Address. Additionally, in this exemplary embodiment, the Message Transfer Part (MTP) Destination Point Code is 235-2-2 and the MTP Originating Point Code is 200-1-1.

Optionally, ANSI SS7 Operator-A 450 could route the traffic to one or more ANSI STP 452, 454 prior to routing to the V-GTT Service on the SCCP Gateway 455. The STPs 452, 454 may perform Global Title Translation and then route the traffic to the V-GTT Service Hub-B ANSI Point Code, which will then apply hub specific treatment and appropriate routing to Hub-B 465.

In operation, the Virtual GT Translation Service of the SCCP Gateway 455 applies hub specific treatment to the signaling traffic, based upon the requirements of Hub-B 465, and routes the signaling traffic to Hub-B 465. The traffic may be routed to Hub-B 465 through ITU STPs' 460, 462 using Global Title or Translation Type Tables, or alternatively, the traffic may be routed using direct MTP routing to Hub-B 465. Traffic from Hub-B 465 may then be routed back to Operator-A 450.

Note that the implementation shown in FIG. 4A and FIG. 4B does not require protocol conversion because both the originating operator and the destination operator operate under the ANSI SS7 protocol.

In various embodiments, the present invention is configured to be compatible with multiple ANSI SS7 and ITU SS7 GSM hubs in an SS7 Network. The hubs may include, VRS (Vodafone Roaming Services) Hubs, France Telecom (FT) Hubs, Key2Roam Hubs, Link2One Hubs, BICS (Belgacom International Carrier Services) Hubs, and any other existing or new future SS7 Hubs. In each of the hubs, Virtual GT Translation Services provide one ANSI SS7 Point Code and one ITU SS7 Point Code assigned to each of the hubs.

The Virtual Global Title Translation Service of the SCCP Gateway provided by the present invention includes applies the hub-specific requirements for the ANSI SS7 and ITU SS7 hubs.

In a first embodiment, the V-GTT Service provides for prefixing Global Title (GT) Addresses with Hub-B 125 specific GT digits. Hub-B may require that SCCP Called Party Address (CDPA) Global Title (GT) digits be prefixed with certain digits that are representative of that hub and are used to route to that hub. In an exemplary embodiment, Hub-B requires that CDPA GT prefix digits should be 4179991 (which is Key2Roam Hub). GSM SS7 traffic is sent from Operator-A to Operator-B which is behind Hub-B. The CDPA GT Address used in signaling message from Operator-A is Operator-B Global Title Address.

In this embodiment, Operator-A sends its SS7 traffic to Virtual Global Title Translation Service (V-GTTS) Hub-B specific ANSI or ITU SS7 Point Code 115 using CDPA GT Address of Operator-B. If Operator-A is in ANSI SS7 Network, it sends to V-GTTS Hub-B specific ANSI Point Code. If Operator-A is in ITU SS7 Network, it sends to V-GTTS Hub-B specific ITU Point Code.

V-GTTS application receives this message, prefixes the Hub-B specific digits to CDPA GT Address (not to exceed the max GT digits length), and routes the message toward Hub-B. The following are parameters of this exemplary scenario:
1. Originating (visiting) Operator-A is in ANSI SS7 Network:
   a. Operator-A has ANSI PC of 200-1-1
   b. Operator-A has E.164 GT Address of 18136379999.
2. V-GTTS Hub-B specific ANSI Point Code is 235-2-2 and V-GTTS ITU PC is 2-2-2.
3. Destination (home) Operator-B is in ITU SS7 Network and its E.164 GT Address is 44123456789.
4. Hub-B is in ITU SS7 Network and Hub-B ITU Point Code is 3-3-3.
5. Hub-B GT prefix is 4179991.

As such, Operator-A sends ANSI SS7 traffic with MTP DPC=235-2-2, MTP OPC=200-1-1 with CDPA GT Address=44123456789 and CGPA GT Address of 18136379999.

V-GTTS then receives this message, performs ANSI SS7 to ITU SS7 protocol conversion, changes outgoing ITU CDPA GT Address to 417991441234567. V-GTTS routes this message on ITU SS7 side to Hub-B DPC=3-3-3 through ITU STP's.

Hub-B then removes its hub specific digits and routes the message to Operator-B behind Hub-B. Operator-B responds back to Hub-B and Hub-B sends message back to V-GTTS on ITU SS7 Network with CDPA GT Address of Operator-A (18136379999) and DPC=2-2-2 of V-GTTS. Note: Hub-B can also send message back to ITU STP which has E.164 GT Table built to route Operator-A traffic to V-GTTS (E.164 range 1813637 mapped to V-GTTS ITU PC of 2-2-2).

V-GTTS then performs ITU to ANSI SS7 protocol conversion and routes this message to Operator-A PC=200-1-1 on ANSI SS7 side.

In a second embodiment, the V-GTT may be configured for altering Global Title (GT) addresses specific to Hub-B. This embodiment is similar to the first embodiment for prefixing Global Title (GT) Addresses with Hub-B 125 specific GT digits, however, instead of prefixing the SCCP Called Party (CDPA) Global Title (GT) digits, V-GTTS replaces (alters) the SCCP CDPA GT digits with Hub-B specific GT digits.

In a third embodiment, the V-GTT may also be configured for changing Translation Type (TT) specific to Hub-B. In this embodiment, instead of replacing the CDPA GT digits, V-GTTS replaces (alters) the SCCP Called Party Address "Translation Type" with hub-specific TT value.

In a fourth embodiment, the V-GTT is also capable of changing Numbering Plan (NP) specific to Hub-B, wherein, instead of replacing the CDPA Translation Type, as in the third embodiment, V-GTTS replaces (alters) the SCCP Called Party Address "Numbering Plan" with hub-specific NP value.

In fifth embodiment, the V-GTT may change an Encoding Scheme (ES) specific to Hub-B. In this embodiment, instead of replacing the CDPA Numbering Plan, as in the fourth embodiment, V-GTTS replaces (alters) the SCCP Called Party Address "Encoding Scheme" with hub specific ES value.

In a sixth embodiment, the V-GTT may changing the Nature of Address (NOA) for Hub-B. In this embodiment, instead of replacing the CDPA Encoding Scheme, as in the fifth embodiment, V-GTTS replaces (alters) the SCCP Called Party Address "Nature of Address" with hub specific NOA value.

In a seventh embodiment, GT, TT, NP, ES, NOA Treatment may be applied by the V-GTT on a per GSM MAP or CAP Operation Code and Application Context specific to Hub-B. In this embodiment, instead of replacing the CDPA GT digits, as in the second embodiment, V-GTTS replaces (alters) the SCCP Called Party Address GT, TT, NP, ES, NOA values based on the GSM MAP or CAP Operation Code and Application Context with hub specific values. For example, Hub-B may require specific values for SCCP Called Party Global Title (GT) Address, Translation Type (TT), Numbering Plan (NP), Encoding Scheme (ES), Nature of Address (NOA) based on the GSM MAP (Mobile Application Part) or CAP (CAMEL Application Part) Operation Code and Application Context values.

In an exemplary embodiment of the seventh embodiment, Hub-B requirements may specify that all GSM MAP messages should have SCCP CDPA GT prefix of 417888, but in addition SMS-MO should have SCCP CDPA TT=21 with ES=2, Update Location (UL), Send Authentication Information (SAI) and Update GPRS Location (UL GPRS) should have TT=23 and ES=1. In this scenario, Operator-A would normally route its SS7 traffic to V-GTTS ANSI/ITU Hub-B specific point code. V-GTTS will apply these Hub specific updates and send the message to Hub-B.

Taking the example from the first embodiment and applying it to this scenario, Hub-B requires that SCCP Called Party Address (CDPA) Global Title (GT) digits be prefixed with certain digits that are representative of that hub and used to route to that hub. In this example, Hub-B requires that CDPA GT prefix digits should be 417888, Hub-B requires that SMS-MO message should have CDPA TT=21 ES=2 and Hub-B requires that UL, SAI and UL-GPRS should have CDPA TT=23, ES=1.

As such, GSM SS7 traffic is sent from Operator-A to Operator-B, which is behind Hub-B. The CDPA GT Address used in signaling message from Operator-A is Operator-B Global Title Address (or ANSI E.212 IMSI belonging to Operator-B or ITU E.214 Mobile Global Title (MGT) belonging to Operator-B).

Operator-A then sends its SS7 traffic to Virtual Global Title Translation Service (V-GTTS) Hub-B specific ANSI or ITU SS7 Point Code using CDPA GT Address of Operator-B. If Operator-A is in ANSI SS7 Network, it sends to V-GTTS Hub-B specific ANSI Point Code. If Operator-A is in ITU SS7 Network, it sends to V-GTTS Hub-B specific ITU Point Code.

The V-GTTS application then receives this GSM SS7 message, prefixes the Hub-B specific digits to CDPA GT Address (not to exceed the max GT digits length) for all messages. For SMS-MO messages, V-GTTS sets outgoing CDPA TT=21 ES=2 towards Hub-B, and, for UL, SAI, UL-GPRS messages, V-GTTS sets CDPA TT=23 ES=1 and routes the message towards Hub-B. In one example scenario:

1. Originating (visiting) Operator-A is in ANSI SS7 Network:
   a. Operator-A has ANSI PC of 200-1-1
   b. Operator-A has E.164 GT Address of 18136379999.
2. V-GTTS Hub-B specific ANSI Point Code is 235-2-2 and V-GTTS ITU PC is 2-2-2.
3. Destination (home) Operator-B is in ITU SS7 Network and its E.164 GT Address is 4422123456789.
4. Hub-B is in ITU SS7 Network and Hub-B ITU Point Code is 3-3-3.
5. Hub-B GT prefix is 417888.

Operator-A sends ANSI SS7 traffic with MTP DPC=235-2-2, MTP OPC=200-1-1 with CDPA E.164 GT Address=4422123456789 or E.212. GT Address=23400123456789 and CGPA GT Address of 18136379999.

V-GTTS then receives this message and V-GTTS performs ANSI SS7 to ITU SS7 protocol conversion, changes outgoing ITU E.164 CDPA GT Address to 4178884422123456789 (prefixing Hub-B specific digits), applies max digits rule (in this example configurable to maximum 16 digits), with outgoing CDPA GT Address=4178884422123456 and routes this message on ITU SS7 side to Hub-B DPC=3-3-3 through ITU STP's. If GSM MAP UL, SAI and UL-GPRS (Operation Codes 2, 56, 23) are E.212 routed (ANSI CDPA TT=9), V-GTTS performs ANSI SS7 to ITU SS7 protocol conversion, converts ANSI E.212 23400123456789 GT Address to ITU E.214 4422123456789 (assuming E.212 23400↔E.214 4422), changes outgoing ITU E.214 CDPA GT Address to 4178884422123456789 (prefixing Hub-B specific digits), applies max digits rule (max 16 digits), with outgoing CDPA GT Address=4178884422123456, sets CDPA TT=23 ES=1, and routes this message on ITU SS7 side to Hub-B DPC=3-3-3 through ITU STP's.

For GSM MAP SMS-MO Messages (Operation Code 46), V-GTTS performs ANSI SS7 to ITU SS7 protocol conversion, changes outgoing ITU E.164 CDPA GT Address to 4178884422123456789 (prefixing Hub-B specific digits), applies max digits rule (configurable, in our example max 16 digits), with outgoing CDPA GT Address=4178884422123456, CDPA TT=21 ES=2, and routes this message on ITU SS7 side to Hub-B DPC=3-3-3 through ITU STP's.

If GSM MAP UL, SAI and UL-GPRS (Operation Codes 2, 56, 23) are E.164 routed (ANSI CDPA TT=10), V-GTTS performs ANSI SS7 to ITU SS7 protocol conversion, changes outgoing ITU E.164 CDPA GT Address to 4178884422123456789 (prefixing Hub-B specific digits), applies max digits rule (configurable, in our example max 16 digits), with outgoing CDPA GT Address=4178884422123456, sets CDPA TT=23 ES=1, and routes this message on ITU SS7 side to Hub-B DPC=3-3-3 through ITU STP's.

Hub-B then removes its hub-specific digits and routes the message to Operator-B behind Hub-B. Operator-B responds back to Hub-B and Hub-B sends message back to V-GTTS on ITU SS7 Network with CDPA GT Address of Operator-A (18136379999) and MTP DPC=2-2-2 of V-GTTS. Note: Hub-B can also send message back to ITU STP which has E.164 GT Table built to route Operator-A traffic to V-GTTS (E.164 range 1813637 mapped to V-GTTS ITU PC of 2-2-2). V-GTTS then performs ITU to ANSI SS7 protocol conversion and routes this message to Operator-A PC=200-1-1 on ANSI SS7 side.

In an eighth embodiment, the V-GTTS may modify any SCCP or TCAP parameters specific to Hub-B. Like the seventh embodiment, V-GTTS has the capability to modify any SCCP and TCAP parameters with hub specific values. Additionally, V-GTTS can also modify any SCCP (Called or Calling Party Address) parameter values and modify any GSM MAP/TCAP Message parameter values required by specific hub.

In this embodiment, Hub-B may require that all SMS-MO messages routed to Hub-B should have SM-RP-DA parameter (Short Message Service Center Address) be prefixed with digits 33. For this requirement, V-GTTS will parse SMS-MO TCAP/MAP message and prefix SM-RP-DA address with digits 33, rebuild the SMS-MO TCAP/MAP message with correct offsets and lengths and routes the message towards Hub-B. In this scenario V-GTTS has now modified the SMS-MO message with SCCP CDPA TT=21, CDPA GT=4178884422123456 and TCAP/MAP where SM-RP-DA parameter is now prefixed with digits 33 when sent towards Hub-B.

For TCAP/MAP parameters in GSM MAP/CAP message, V-GTTS has the capability to add/update/delete any TCAP/MAP parameter specific to any GSM MAP/CAP message. Here modify=>add or update or delete.

For SCCP parameters, V-GTTS has the capability to update any SCCP parameter values, which can be specific to any GSM MAP/CAP message (or all GSM messages). Here modify=>update.

Abbreviations

| | |
|---|---|
| ANSI | American National Standards Institute |
| CAMEL | Customized Applications for Mobile Enhanced Logic |
| CAP | CAMEL Application Part |
| CDPA | SCCP Called Party Address |
| CGPA | SCCP Calling Party Address |
| DPC | Destination Point Code |
| ES | Encoding Scheme |
| GSM | Global System for Mobile Communication |
| GT | Global Title |
| HLR | Home Location Register |
| IMSI | International Mobile Subscriber Identity |

-continued

| | |
|---|---|
| ITU | International Telecommunications Union |
| LUDT | Large Unit Data SS7 Message |
| LUDTS | Large Unit Data Service SS7 Message |
| MAP | Mobile Application Part |
| MSC | Mobile Switching Center |
| MSISDN | Mobile Station International Subscriber Directory Number |
| MGT | Mobile Global Title |
| MSU | Message Signaling Unit |
| MTP | Message Transfer Part of SS7 |
| NOA | Nature of Address Indicator |
| NP | Numbering Plan |
| OP | Operator |
| OPC | Originating Point Code |
| PC | Point Code |
| RI | Routing Indicator |
| SCCP | Signaling Connection Control Part of SS7 |
| SLS | Signaling Link Selection |
| SS7 | Signaling System Number 7 |
| SSN | Sub System Number |
| TT | Translation Type |
| UDT | Unit Data SS7 Message |
| UDTS | Unit Data Service SS7 Message |
| V-GTTS | Virtual Global Title Translation Service |
| VLR | Visiting Location Register |
| XUDT | Extended Unit Data SS7 Message |
| XUDTS | Extended Unit Data Service SS7 Message |

Software and Hardware Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

While methods, apparatuses, and systems have been described in connection with exemplary embodiments of the various figures, it is to be understood that other similar embodiments can be used or modifications and additions can be made to the described embodiments for performing the same function without deviating therefrom. Therefore, the invention should not be limited to any single embodiment, but rather should be construed in breadth and scope in accordance with the appended claims.

What is claimed is:

1. A method for transmitting signaling traffic in a mobile communications network, the method comprising:
   providing a plurality of destination hubs;
   providing a plurality of destination network operators, wherein each of the plurality of destination network operators are configured to receive signaling traffic from one of the plurality of destination hubs;
   providing a plurality of originating network operators;
   assigning a destination hub-specific point code for each of the plurality of destination hubs in a Virtual Global Title Translation (VGTT) Service of a Signaling Connection Control Part (SCCP) Gateway of a mobile communications network, wherein the VGTT Service of the SCCP Gateway includes a predefined set of rules for each of the plurality of destination hubs based upon one or more requirements of the destination hub and wherein the predefined set of rules are selected from the group consisting of: prefixing Global Title (GT) Addresses with destination hub-specific GT digits, altering a GT Address specific to the destination hub, changing a Translation Type, changing a Numbering Plan (NP), changing an Encoding Scheme (ES), changing a Nature of Address (NOA), applying GT treatment per GSM Mobile Application Part Map (MAP) and CAMEL Application Part (CAP) Operation code and an Application Context, applying NP treatment per GSM Mobile Application Part Map (MAP) and CAMEL Application Part (CAP) Operation code and an Application Context, applying ES treatment per GSM Mobile Application Part Map (MAP) and CAMEL Application Part (CAP) Operation code and an Application Context, applying NOA treatment per GSM Mobile Application Part (MAP) and CAMEL Application Part (CAP) Operation Code and an Application Context, modifying SCCP parameters and modifying Transaction Capabilities Application Part (TCAP) parameters;
   transmitting signaling traffic from one of the plurality of originating network operators, wherein the signaling traffic includes a called party (CDPA) Global Title identifying a destination network operator of the plurality of destination network operators that the originating network operator wants to roam with, and wherein the signaling traffic further includes a destination point code, wherein the destination point code identifies the destination hub that the destination network operator is configured to receive signaling traffic from and the destination point code does not identify the SCCP Gateway, and wherein the originating network operator does not apply the predetermined set of rules for the destination hub based upon one or more requirements of the destination hub prior to transmitting the signaling traffic;
   receiving the signaling traffic at a destination hub-specific point code of the SCCP Gateway that is assigned to the destination hub for the destination network operator that the originating network operator wants to roam with and that is configured to receive signaling traffic from, wherein the signaling traffic includes the destination point code that identifies the destination hub that the destination network operator is configured to receive signaling traffic from and the destination point code does not identify the SCCP Gateway, wherein the originating network operator utilizes a first Signaling System 7 (SS7) protocol and the destination hub utilizes a second SS7 protocol and wherein the first SS7 protocol is an International Telecommunications Union (ITU) SS7 protocol and the second SS7 protocol is an American National Standards Institute (ANSI) SS7 protocol;

applying, by the VGTT Service of the SCCP Gateway, the predefined set of rules to the received signaling traffic based upon one or more requirements of the destination hub;

performing, by the SCCP Gateway, protocol conversion between the ITU protocol and the ANSI protocol; and routing, by the SCCP Gateway, the signaling traffic between the originating network operator and the destination hub using the ANSI protocol and between the destination hub and the originating network operator using the ITU protocol.

2. A method for transmitting signaling traffic in a mobile communications network, the method comprising:

providing a plurality of destination hubs;

providing a plurality of destination network operators, wherein each of the plurality of destination network operators are configured to receive signaling traffic from one of the plurality of destination hubs;

providing a plurality of originating network operators;

assigning a destination hub-specific point code for each of the plurality of destination hubs in a Virtual Global Title Translation (VGTT) Service of a Signaling Connection Control Part (SCCP) Gateway of a mobile communications network, wherein the VGTT Service of the SCCP Gateway includes a predefined set of rules for each of the plurality of destination hubs based upon one or more requirements of the destination hub and wherein the predefined set of rules are selected from the group consisting of: prefixing Global Title (GT) Addresses with destination hub-specific GT digits, altering a GT Address specific to the destination hub, changing a Translation Type, changing a Numbering Plan (NP), changing an Encoding Scheme (ES), changing a Nature of Address (NOA), applying GT treatment per GSM Mobile Application Part Map (MAP) and CAMEL Application Part (CAP) Operation code and an Application Context, applying NP treatment per GSM Mobile Application Part Map (MAP) and CAMEL Application Part (CAP) Operation code and an Application Context, applying ES treatment per GSM Mobile Application Part Map (MAP) and CAMEL Application Part (CAP) Operation code and an Application Context, applying NOA treatment per GSM Mobile Application Part (MAP) and CAMEL Application Part (CAP) Operation Code and an Application Context, modifying SCCP parameters and modifying Transaction Capabilities Application Part (TCAP) parameters;

transmitting signaling traffic from one of the plurality of originating network operators, wherein the signaling traffic includes a called party (CDPA) Global Title identifying a destination network operator of the plurality of destination network operators that the originating network operator wants to roam with, wherein the signaling traffic further includes a destination point code, wherein the destination point code identifies the destination hub that the destination network operator is configured to receive signaling traffic from and the destination point code does not identify the SCCP Gateway, and wherein the originating network operator does not apply the predetermined set of rules for the destination hub based upon one or more requirements of the destination hub prior to transmitting the signaling traffic;

receiving the signaling traffic at a destination hub-specific point code of the SCCP Gateway that is assigned to the destination hub for the destination network operator that the originating network operator wants to roam with and that is configured to receive signaling traffic from, wherein the signaling traffic includes the destination point code that identifies the destination hub that the destination network operator is configured to receive signaling traffic from and the destination point code does not identify the SCCP Gateway, wherein the originating network operator utilizes a first Signaling System 7 (SS7) protocol and the destination hub utilizes a second SS7 protocol and wherein the first SS7 protocol is an American National Standards Institute (ANSI) SS7 protocol and the second SS7 protocol is an International Telecommunications Union (ITU) SS7 protocol;

applying, by the VGTT Service of the SCCP Gateway, the predefined set of rules to the received signaling traffic based upon one or more requirements of the destination hub;

performing, by the SCCP Gateway, protocol conversion between the ANSI protocol and the ITU protocol; and routing, by the SCCP Gateway, the signaling traffic between the originating network operator and the destination hub using the ITU protocol and between the destination hub and the originating network operator using the ANSI protocol.

3. The method of claim 1, wherein the destination hub-specific point code is an ANSI SS7 point code.

4. The method of claim 2, wherein the destination hub-specific point code is an ITU SS7 point code.

5. The method of claim 1, wherein the destination hub is selected from the group consisting of a VRS (Vodafone Roaming Services) Hub, a France Telecom (FT) Hub, a Key2Roam Hub, a Link2One Hub, a BICS (Belgacom International Carrier Services) Hub.

6. The method of claim 2, wherein the destination hub is selected from the group consisting of a VRS (Vodafone Roaming Services) Hub, a France Telecom (FT) Hub, a Key2Roam Hub, a Link2One Hub, a BICS (Belgacom International Carrier Services) Hub.

7. The method of claim 1, wherein performing, by the SCCP Gateway, protocol conversion between the ITU protocol and the ANSI protocol is performed by a Virtual Global Title Translation (GTT) Service of the SCCP Gateway.

8. The method of claim 2, wherein performing, by the SCCP Gateway, protocol conversion between the ANSI protocol and the ITU protocol is performed by a Virtual Global Title Translation (GTT) Service of the SCCP Gateway.

9. The method of claim 1, further comprising, prior to receiving the signaling traffic at the SCCP Gateway:

receiving the signaling traffic at one or more Signal Transfer Points (STPs); and routing the signaling traffic from the one more STPs to the SCCP Gateway.

10. The method of claim 2, further comprising, prior to receiving the signaling traffic at the SCCP Gateway:

receiving the signaling traffic at one or more Signal Transfer Points (STPs); and routing the signaling traffic from the one more STPs to the SCCP Gateway.

11. The method of claim 2, wherein routing, by the SCCP Gateway, the signaling traffic between the originating network operator and the destination hub using the ITU protocol further comprises, routing the signaling traffic through one or more STPs using the ITU protocol prior to routing the signaling traffic to the destination hub.

12. A system for transmitting signaling traffic in a mobile communications network, the system comprising:
   a plurality of destination hubs;
   a plurality of destination network operators, each of the plurality of destination network operators configured to receive signaling traffic from one of the plurality of destination hubs;
   a plurality of originating network operators;
   a Signaling Connection Control Part (SCCP) Gateway of a mobile communications network, the SCCP Gateway in communication with the plurality of destination hubs and with the plurality of originating network operators, and the SCCP Gateway comprising a Virtual Global Title Translation (VGTT) Service having a destination hub-specific point code for each of the plurality of destination hubs, wherein the VGTT Service of the SCCP Gateway includes a predefined set of rules for each of the plurality of destination hubs based upon one or more requirements of the destination hub and wherein the predefined set of rules are selected from the group consisting of: prefixing Global Title (GT) Addresses with destination hub-specific GT digits, altering a GT Address specific to the destination hub, changing a Translation Type, changing a Numbering Plan (NP), changing an Encoding Scheme (ES), changing a Nature of Address (NOA), applying GT treatment per GSM Mobile Application Part Map (MAP) and CAMEL Application Part (CAP) Operation code and an Application Context, applying NP treatment per GSM Mobile Application Part Map (MAP) and CAMEL Application Part (CAP) Operation code and an Application Context, applying ES treatment per GSM Mobile Application Part Map (MAP) and CAMEL Application Part (CAP) Operation code and an Application Context, applying NOA treatment per GSM Mobile Application Part (MAP) and CAMEL Application Part (CAP) Operation Code and an Application Context, modifying SCCP parameters and modifying Transaction Capabilities Application Part (TCAP) parameters;
   the SCCP Gateway for:
      receiving signaling traffic at a destination hub-specific point code of the SCCP Gateway, wherein the signaling traffic is transmitted from one of the plurality of originating network operators, wherein the signaling traffic includes a called party (CDPA) Global Title identifying a destination network operator of the plurality of destination network operators that the originating network operator wants to roam with, wherein the destination network operator is configured to receive signaling traffic from one of the plurality of destination hubs and wherein the signaling traffic further includes a destination point code, wherein the destination point code identifies the destination hub that the destination network operator is configured to receive signaling traffic from and the destination point code does not identify the SCCP Gateway, and wherein the originating network operator does not apply the predetermined set of rules for the destination hub based upon one or more requirements of the destination hub prior to transmitting the signaling traffic, wherein the originating network operator utilizes a first Signaling System 7 (SS7) protocol and the destination hub utilizes a second SS7 protocol and wherein the first SS7 protocol is different than the second SS7 protocol;
   the SCCP Gateway for:
      applying, by the Virtual Global Title Translation (GTT) Service of the SCCP Gateway, the predefined set of rules to the received signaling traffic based upon one or more requirements of the destination hub;
      performing, by the SCCP Gateway, protocol conversion between the first SS7 protocol and the second SS7 protocol; and
      routing, by the SCCP Gateway, the signaling traffic between the originating network operator and the destination hub using the second SS7 protocol and between the destination hub and the originating network operator using the first SS7 protocol.

13. The system of claim 12, wherein the first SS7 protocol is an International Telecommunications Union (ITU) SS7 protocol and the second SS7 protocol is an American National Standards Institute (ANSI) SS7 protocol.

14. The system of claim 12, wherein the first SS7 protocol is an American National Standards Institute (ANSI) SS7 protocol and the second SS7 protocol in an International Telecommunications Union (ITU) SS7 protocol.

15. The system of claim 13, wherein the destination hub-specific point code is an ANSI SS7 point code.

16. The system of claim 14, wherein the destination hub-specific point code is an ITU SS7 point code.

17. The system of claim 12, wherein the destination hub is selected from the group consisting of a VRS (Vodafone Roaming Services) Hub, a France Telecom (FT) Hub, a Key2Roam Hub, a Link2One Hub, a BICS (Belgacom International Carrier Services) Hub.

18. The system of claim 12, wherein performing, by the SCCP Gateway, protocol conversion between the first SS7 protocol and the second SS7 protocol is performed by a Virtual Global Title Translation (GTT) Service of the SCCP Gateway.

\* \* \* \* \*